US006543970B1

(12) United States Patent
Qvarth et al.

(10) Patent No.: US 6,543,970 B1
(45) Date of Patent: Apr. 8, 2003

(54) DOUBLE NEGATIVE CUTTING INSERT FOR TOOLS FOR CHIP REMOVING MACHINING

(75) Inventors: Ingemar Qvarth, Valbo (SE); Anders Nilsson, Sandviken (SE); Willy Åström, Sandviken (SE); Per Berjerstål, Gävle (SE); Stefan Scherbarth, Neuss (DE)

(73) Assignee: Sandvik Aktiebolag, Sandviken (SE)

( * ) Notice: Subject to any disclaimer, the term of this patent is extended or adjusted under 35 U.S.C. 154(b) by 162 days.

(21) Appl. No.: 09/693,997

(22) Filed: Oct. 23, 2000

(30) Foreign Application Priority Data

Oct. 22, 1999 (SE) .............................. 9903817

(51) Int. Cl.7 .......................... B23B 27/22; B23B 27/00
(52) U.S. Cl. ........................................ 407/114; 407/115
(58) Field of Search ................................. 407/113–117

(56) References Cited

U.S. PATENT DOCUMENTS

| 3,497,933 A | | 3/1970 | Okada | |
|---|---|---|---|---|
| 3,934,319 A | * | 1/1976 | Schuler | 407/113 |
| 4,359,300 A | * | 11/1982 | Hazra et al. | 407/114 |
| 4,475,851 A | * | 10/1984 | Hale | 407/113 |
| 4,597,695 A | * | 7/1986 | Johnson | 407/113 |
| 4,606,679 A | * | 8/1986 | Jeremias | 407/114 |
| RE32,636 E | * | 4/1988 | Stashko | 407/114 |
| 4,776,732 A | * | 10/1988 | Hale | 407/114 |
| 4,915,548 A | * | 4/1990 | Fouquer et al. | 407/114 |
| 4,954,201 A | | 9/1990 | Latz et al. | |
| 4,966,500 A | | 10/1990 | Tsujimura et al. | |
| 5,011,340 A | * | 4/1991 | Pettersson et al. | 407/114 |
| 6,224,300 B1 | * | 5/2001 | Baxivanelis et al. | |
| 6,336,776 B1 | * | 1/2002 | Noggle | 407/114 |

FOREIGN PATENT DOCUMENTS

WO    WO 9851438 A1 * 11/1998 ........... B23B/27/14

* cited by examiner

Primary Examiner—A. L. Wellington
Assistant Examiner—Dana Ross
(74) Attorney, Agent, or Firm—Burns, Doane, Swecker & Mathis, LLP

(57) ABSTRACT

A double negative cutting insert has opposite top and bottom sides between which transverse flank surfaces extend, adjacent to which cutting edges are formed. There are at least four useful major cutting edges, which separately extend from an active operating corner towards a nearby first inactive corner. Each major cutting edge co-operates with a minor cutting edge with the purpose of face machining the surface, that is left after material removal. The cutting insert has an octagonal basic shape, the top and bottom sides thereof having an identical shape with four spaced-apart supporting projections, which are placed near the four inactive corners and have plane abutment surfaces located in a common plane. An individual land adjacent to the major cutting edges has a concavely arched shape in order to provide a positive cutting geometry during operation.

11 Claims, 6 Drawing Sheets

DOUBLE NEGATIVE CUTTING INSERT FOR TOOLS FOR CHIP REMOVING MACHINING

TECHNICAL FIELD OF THE INVENTION

The present invention relates to a double negative cutting insert intended for tools for chip removing machining of the type that comprises a body with a flat, polygonal basic shape which has opposite upper and lower sides of identical shape. Those sides are turned from an imaginary neutral plane through the body and transverse flank surfaces extend between those sides adjacent to which material-removing major cutting edges are formed. The major cutting edges extend from the area of a corner and co-operate with a minor cutting edge formed adjacent to a parallel land. The minor cutting edge has the purpose of planar machining the surface of a work piece which is left after material removal.

BACKGROUND OF THE INVENTION

Double negative and double-positive cutting inserts have advantages as well as disadvantages. A double negative insert is an indexible negative insert having cutting edges on its top and bottom sides. The double negative cutting inserts of conventional type are advantageous because cutting edges may be formed adjacent to the two opposite sides of the cutting insert body. In this way, the cutting insert may be formed with a generally doubled number of cutting edges in comparison with double-positive cutting inserts of the corresponding type. This means that a large number of cutting edges may be used before the individual cutting insert has to be discarded. This is something, which in turn reduces the purchase costs of the user. However, a disadvantage of the double negative cutting inserts is that they have mediocre cutting performance. This is something, which means impaired operating economy. Double-positive cutting inserts, on the other hand, have good cutting performance and enables quick and efficient working, but such cutting inserts may be formed with cutting edges only along the top side thereof. This is something which limits the number of feasible cutting edges.

Previously, cutting inserts have been developed which combine the conventional advantages of the double negative and double-positive cutting inserts, respectively, without the defects of the above-mentioned disadvantages. That is due to the cutting insert being endowed with a double negative basic shape at the same time as the top and bottom sides of the cutting inserts are formed with countersinks adjacent to the cutting edges in order to bring about a positive cutting geometry during operation. Previously known combination cutting inserts of this type have, however, had a square or hexagonal shape. As an example of such a combination cutting insert, a cutting insert should be mentioned which is commercially available under the trade mark TRIGON and is marketed by Greenleaf Corporation, Greenleaf Drive, Saegertown, Pa. 16433.

An aggravating disadvantage of square as well as hexagonal cutting inserts is, however, that the corner angle at each active working corner becomes moderate. Thus, in square cutting inserts, the corner angle is 90° and in the hexagonal cutting inserts of the type TRIGON, the corner angle is even smaller. This means that the active corner becomes considerably acute, whereby the corner portion of the cutting insert risks to be broken up if it is submitted to considerable forces during operation.

U.S. Pat. Nos. 3,497,933, 4,954,021 and 4,966,500 show different embodiments of cutting inserts having a generally octagonal basic shape; i.e. cutting inserts which in one way or the other way have eight edges.

OBJECTS AND FEATURES OF THE INVENTION

The present invention aims at obviating the above-mentioned inconveniences of previously known combination cutting inserts and at providing an improved cutting insert. Therefore, a primary object of the invention is to provide a cutting insert, which may be formed with a large number of cutting edges adjacent to active corners of a strong and robust character, and that in spite of this should be able to be fixed in a steady and reliable way in a corresponding insert seat. Although the cutting insert according to the invention should be able to be used for a wide variety of tools for chip removing machining, such as turning tools, the insert is primarily intended for milling tools, in particular face mills and side-milling cutters, regardless whether these for the mounting of the cutting inserts make use of cassettes or not. In a particular aspect, the invention aims at providing a cutting insert which is optimized for milling tools of the type that is either right-hand cutting or left-hand cutting, the purpose being to bring about the largest feasible number of useful strong cutting edges for either of these two working cases. In another aspect, the invention aims at providing a cutting insert which is "neutral," to the extent that one and the same cutting insert should be able to be used for either right-hand cutting working or left-hand cutting working; all with the purpose of obviating the need of separate stock-keeping and distribution of two different types of cutting inserts. Another aim of the invention is to create a cutting insert, which may be manufactured in a simple way, above all in respect of the ability to release from a mold after molding. Another aim is to create a cutting insert which may be formed with an aperture intended for a fixing screw, which aperture has a diameter which is large in relation to the dimension of the cutting insert, the outermost aim being to enable manufacture of small cutting inserts with many cutting edges which may be fixed by means of simple, conventional fixing screws.

According to the invention, at least the primary aim is attained by a double negative cutting insert for chip removing machining. The insert includes a body of generally flat polygonal basic shape. The body has opposite top and bottom sides of identical shape, and eight transverse flank surfaces extending between the top and bottom sides, wherein the polygonal shape is octagonal with eight obtuse-angle corners. The corners comprise four active cutting corners and four inactive cutting corners. Two of the flank surfaces approach one another at each active cutting corner and are spaced from one another by a pair of lands. Each flank surface forms a major cutting edge at the top side and a major cutting edge at the bottom side. Each land forms a minor cutting edge at least at one of the top and bottom sides, wherein each active cutting corner at the top side includes at least one major cutting edge and at least one minor cutting edge. Each of the top and bottom sides includes four upstanding supporting projections disposed adjacent respective ones of the inactive corners. Each supporting projection includes a planar top surface. The top surfaces of the supporting projections on the top side lie in a common plane oriented parallel to a neutral plane of the body disposed midway between the top and bottom sides. The top surfaces of the supporting projections on the bottom side lie in a common plane oriented parallel to the neutral plane. Each of the top and bottom sides includes areas disposed at each active corner between respective pairs of adjacent supporting projections. Those areas comprise concave lands to provide a positive cutting geometry during cutting operations.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
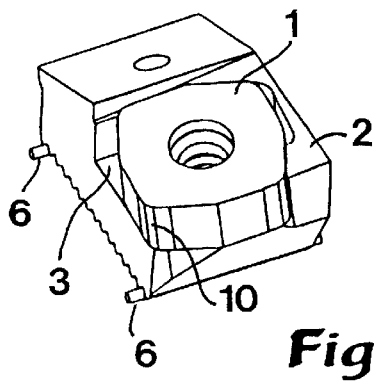
FIG. 1 is a perspective view of a schematically shown cutting insert according to the invention fixed in a cassette which is assumed be included in a mining cutter in the form of a face mill (not shown)
Figure 2:
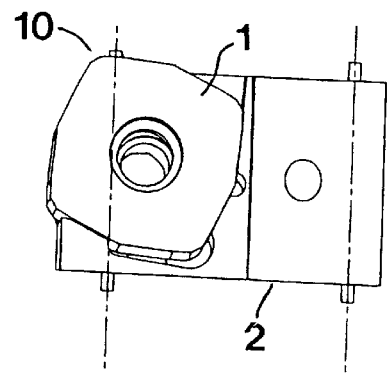
FIG. 2 is a top view of the milling cassette together with the cutting insert according to FIG. 1.
Figure 3:
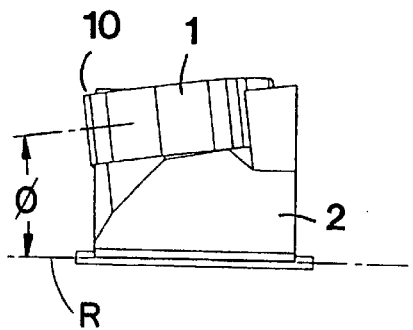
FIG. 3 is an end view of the same cassette and cutting insert.
Figure 4:
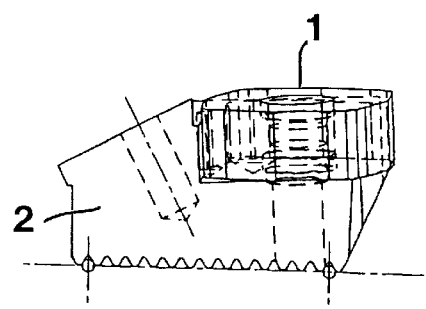
FIG. 4 is a side view of the cassette and the cutting insert.

Before the cutting insert according to the invention is described in detail, reference is made to FIGS. 1–4, which schematically illustrate the cooperation between a cutting insert and a cassette 2, according to the invention. In the cassette, a seat 3 is formed in which the cutting insert is fixed by means of a screw (not shown) tightenable in an aperture (cutting inserts without apertures may be fixed in another way such as by clamps). The cassette 2 is in turn mounted in a peripheral recess in a milling tool, e.g., a head of a face mill (not shown). As is seen in FIGS. 1 and 2, only one of the eight total corners of the cutting insert is active during operation, viz. the corner designated 10 which protrudes towards a side of the cassettes. In FIG. 3 it is shown how the flat cutting insert 1 is oblique in relation to a reference plane R which in FIGS. 1–4 is defined by means of two spaced-apart, thin dowels 6 extending parallel to a center axis around which the milling cutter, and thereby the cutting insert, rotates. The angle of inclination $\phi$ illustrated in FIG. 3 is denominated as an "axial rake angle" by those skilled in the art. In relation to an imaginary tangent along the periphery of the milling disc (not shown), the cutting insert is in practice also radially oblique by forming a so-called "radial rake angle", which is negative in order to guarantee clearance. In practice, these axial and radial rake angles are moderate and may be within the range of 5–15°.

Figure 8:
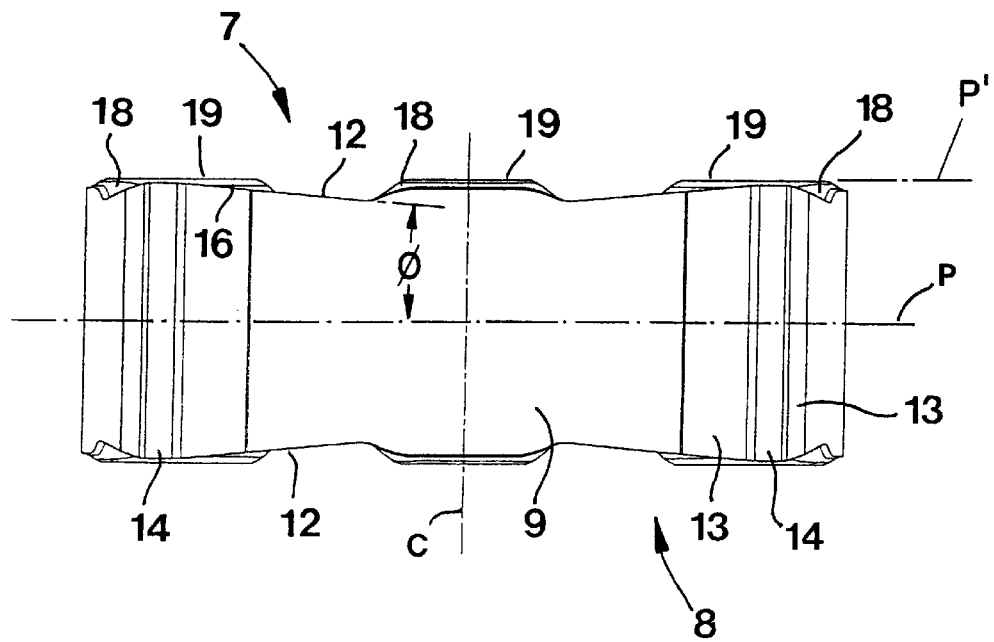
FIG. 8 is a side view of the cutting insert according to FIG. 7.
Figure 9:
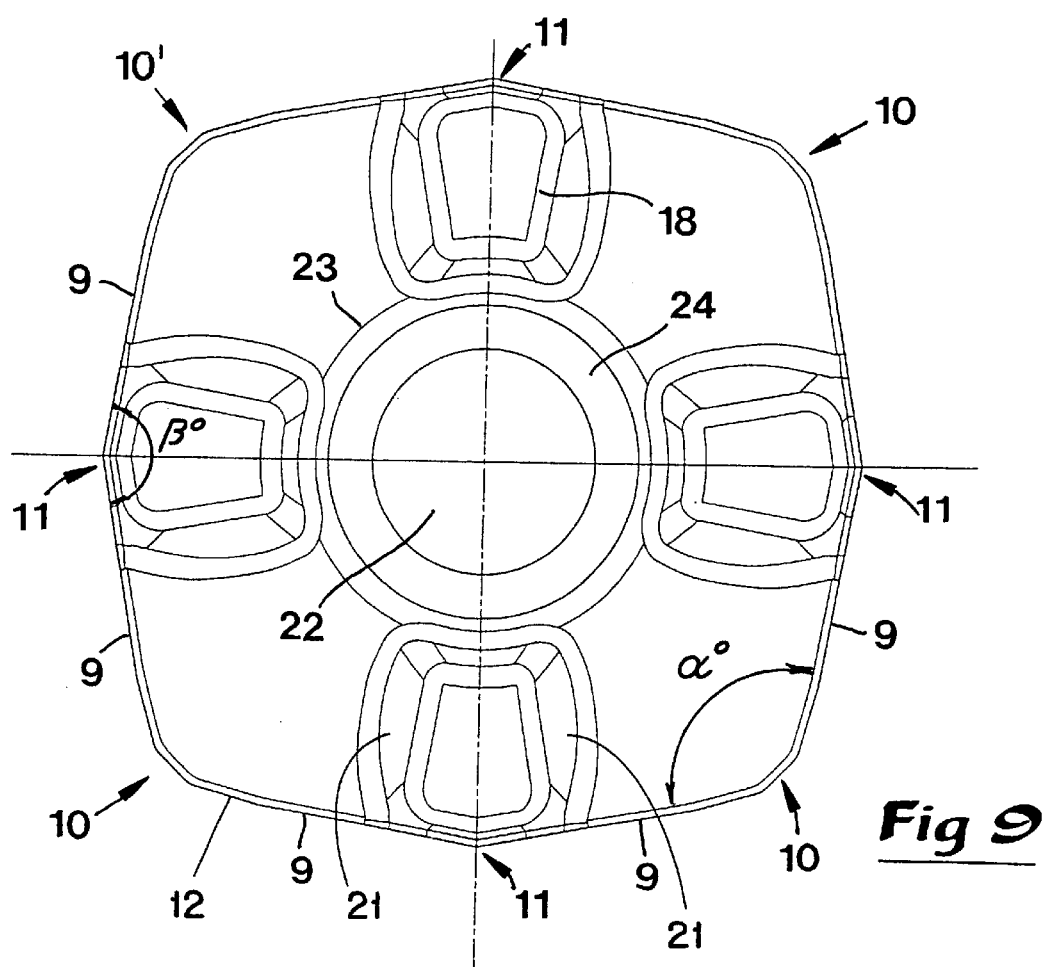
FIG. 9 is a top view of the cutting insert of FIG. 7.

Reference is now made to FIGS. 7–10, which in detail illustrate a first so-called neutral embodiment of a cutting insert 1 according to the invention. The cutting insert consists of a solid body made of a hard and non-abrasive material, e.g., molded and sintered cemented carbide, ceramics or the like. This cutting body has a flat, octagonal basic shape and identical top and bottom sides 7, 8. Actually, in practice, either side 7, 8 can constitute a top side, depending on which side is facing upwardly during a particular cutting operation. That is, the insert can be inverted to reverse the sides 7 and 8. Between these the top and bottom sides, flank surfaces 9 extend, there being eight total flank surfaces 9. In FIG. 8 is seen that the top and bottom sides 7, 8 face away from an imaginary neutral plane P, which extends centrally through the cutting body midway between sides 7, 8. A central, geometric axis C of the insert extends perpendicularly to this neutral plane P.

As a consequence of the octagonal basic shape of the body, each side 7, 8 of the cutting body 1 includes a total of eight corners, of which four are active and designated 10 while the four other corners are always inactive and designated 11. By "active" is meant capable of being oriented in a cutting position by an indexing of the insert. Thus, one of the four first-mentioned corners 10 will be in a cutting position during a working operation, while the other four corners 11 are always out of a cutting position. Each individual corner is disposed between each pair of adjacent flank surfaces 9 which extend at obtuse angle to each other. At each active corner, this obtuse angle is designated $\alpha$, while the corresponding obtuse angle at an inactive corner is designated $\beta$ (see FIG. 9).

Cutting edges are formed at the outer periphery of each of the top and bottom sides of the cutting insert, which sides 7, 8 can be beveled along the cutting edges, if desired. Each flank surface 9 approaching an active corner transforms into a land 13, and between the lands 13 at each active corner there is a transition surface 14. In the example shown, this transition surface 14 is planar, and between the transition surface and each individual land 13 there is a narrow radial transition 15 (the transition surface may be in its entirety softly convexly rounded). The previously mentioned cutting edges at the top side include major cutting edge 12 disposed along respective flank surfaces, and minor cutting edges 16 disposed along respective lands 13. The minor cutting edges are shorter than the major cutting edges 12. These minor cutting edges have the purpose of, in a conventional way, face machining the surface on a work piece, which is left after initial material removal by a major cutting edge. Suppose that the major cutting edge 12' shown in FIG. 10 carries out material removal. Then, the minor cutting edge 16' will face machine the surface left behind on the work piece in order to make this surface smooth. These minor cutting edges 16 may also be denominated "wiper edges".

Where two flank surfaces 9 meet each other adjacent to an inactive corner 11, the transition section may form a marked break line 17. However, at the inactive corners the flank surfaces may also intersect each other via an arched and convexly softly rounded surface.

The top and bottom sides 7, 8 of the cutting insert have one and the same shape. Characteristic of this shape is the existence of four supporting projections 18, which are placed near each one of the four inactive corners 11. The cutting insert is symmetrical in that all inactive corners 11 (like the active corners 10) are equidistantly spaced-apart. This entails that also the supporting projections 18 are equidistantly spaced-apart. In the embodiment according to FIGS. 7–10, each individual supporting projection is located directly behind (i.e., inwardly of) each inactive corner 11 (i.e., a line bisecting the corner also bisects the respective supporting projection). Each individual supporting projection has a planar top abutment surface 19, which is located in a plane P' common for all abutment surfaces of the supporting projections, and is parallel to the neutral plane P. At each active corner, in the area between each pair of adjacent supporting projections, a land 20 extends, which land ends at the edges 12, 16. Characteristic of these lands 20 is that they have a concavely arched shape in order to endow the cutting insert with a positive cutting geometry during operation.

In the illustrated, preferred embodiment, each land 20 extends mainly continuously, i.e., with a smooth surface, from the area of each active corner 10 up to two nearby supporting projections 18. However, it is also feasible to reduce the dimension or area of the arched land, so that the land is given a limited width in the area closest to the cutting edges, then transforming into an elevated, for instance planar, surface. Such a planar, elevated surface may advantageously without interruption transform into the nearby plane abutment surfaces 19 of the supporting projections.

According to a preferred embodiment of the invention, the individual supporting projection 18 has side surfaces 21 inclined obliquely upwards/inwards (i.e., converging) towards the abutment surface 19. Furthermore, the supporting projection is so formed that the side surfaces converge toward a center of the insert, whereby the abutment surface 19 diminishes inwards toward the center of the insert (see FIG. 9).

As is best seen in FIG. 8, the plane P' in which the abutment surfaces 19 of the supporting projections are positioned in common, is located at a larger distance from the neutral plane P than are the portions of the cutting edges 12, 16 positioned farthest from this plane P. In other words, the projections 18 protrude somewhat farther from the neutral plane than do the cutting edges 12. This means that the supporting projections may be applied against a planar supporting surface of the appurtenant insert seat, e.g. the seat 3 in a cassette according to FIGS. 1–4. However, it would also be feasible instead to locate the abutment surfaces of the supporting projections at a lower level than the cutting edges, i.e., the plane P' would be located closer to plane P than would be the cutting edges 12, requiring that the bottom supporting surface of the insert seat be formed with peripheral, flute-like recesses in which the cutting edges may be housed without coming in contact with the supporting surface.

As is furthermore seen in FIG. 8, each individual major cutting edge 12 is, together with the adjacent minor cutting edge 16, oriented obliquely relatively the neutral plane P. More precisely, these edges 12, 16 are sloping from a highest point in the area of the corner transition surface 14 towards a lower point closer to each inactive corner 11. It is to advantage if this angle of inclination θ is within the range of 5–15°.

In the preferred embodiments, which are shown in the drawings, the cutting insert is formed with a central aperture 22. On each opposite side of the cutting insert, the same aperture is delimited by a ring-shaped bulge 23, which projects a distance from the surrounding land 20 and has a planar abutment surface 24 which is parallel to the neutral plane P. In the exemplified embodiments, this abutment surface 24 is positioned at a lower level than the plane P' of the abutment surfaces 19 of the supporting projections. Nevertheless, the abutment surface 24 may be used for supporting either directly against the supporting surface of an insert seat, which has been formed in view of the shape of the supporting projections 18 and the ring bulge 23 together with the level difference therebetween, or against a shim plate formed in a similar way which constitutes a separate unit between the bottom side of the cutting insert and the supporting surface of the insert seat. However, it is also feasible to position the ring-shaped abutment surface 24 of the bulge flush (coplanar) with the abutment surfaces 19 of the supporting projections, i.e. in a plane which is common for all abutment surfaces of the four supporting projections and the ring bulge.

From basic geometry it is known that the sum of the corner angles in an octagon amounts to 1080°. Generally, the rule is also valid that the corner angle at a given corner increases in size if the corner angles at nearby corners decrease. In the embodiment illustrated in FIG. 9, the corner angle α at each active operative corner 10 amounts to 110°, from which it follows that the corner angle β at the inactive corners 11 amounts to 160°. Said angles are defined by the flank surfaces 9 of the cutting insert. However, at each active corner, there are also the two lands 13 which extend in turn at a certain, small angle towards the respective flank surfaces 9 to form an angle of clearance λ (see FIG. 10). In practice, the angle of clearance λ may be within the range of 0.5–5°.

Figure 6:
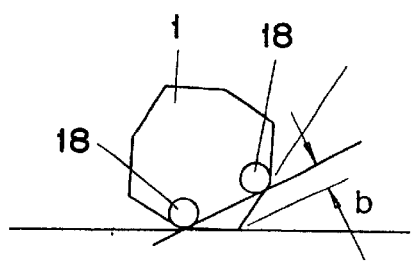
FIGS. 5–6 are schematic illustrations of a vital difference between, on one hand, a square-shaped cutting insert and an octagonal cutting insert according to the invention.
Figure 5:
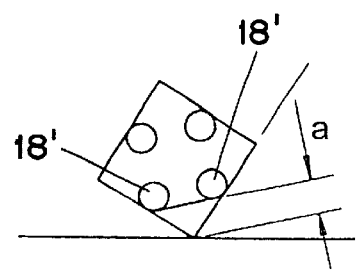
Figure 7:
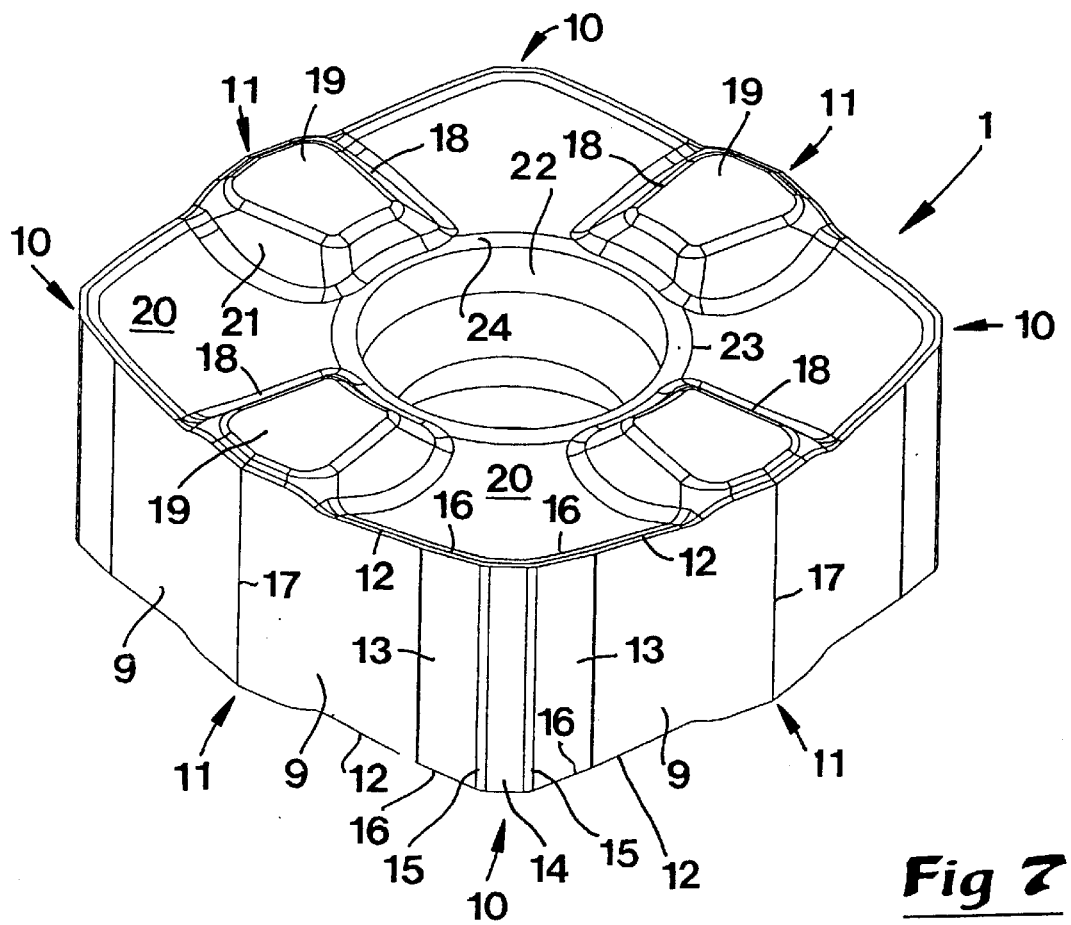
FIG. 7 is a very enlarged perspective view showing a first embodiment of a cutting insert according to the present invention.

Within the scope of the invention, it is possible to vary the above-mentioned corner angles α and β, respectively, within rather wide limits. However, according to the invention, angles within the range of 110–160° or suitably 120–150° are preferred. In a feasible embodiment, the cutting insert may be regular in that all corner angles are equally large and amount to 135°. From this angle value, the corner angle of the active corners may vary upwards as well as downwards. In doing so, the so-called overhang of each individual active corner portion increases with descending corner angle at this portion and vice versa. In order to elucidate the size of the overhang, a comparison has been made in FIGS. 5 and 6 between a conventional, square cutting insert and an octagonal cutting insert according to the invention. If the square cutting insert according to FIG. 5 were provided with supporting projections 18' according to the invention, the overhang "a" would be rather large because each corner portion outside two co-operating supporting projections would be comparatively acute, inasmuch as the corner angle is only 90°. In FIG. 6 a regular, octagonal cutting insert 1 according to the invention is shown, the corner angle at the active the corners amounting to 110°. Because this angle is substantially more obtuse than 90°, the overhang "b" for a given setting angle becomes considerably smaller than in the square cutting insert according to FIG. 5.

Thus, a substantial advantage of the octagonal basic form of the cutting insert according to the invention is that the overhang of the corner portion from nearby supporting projections becomes moderate, provided that the corner angles are within the above-mentioned angle range of 110–160°. Therefore, cutting inserts that are to work under large stress should be formed with large corner angles at the active corners.

It should be pointed out that all flank surfaces 9 are planar and extend perpendicularly to the neutral plane P. However, cutting inserts for lighter work may be formed with a slightly marked, central waist.

Function of the Cutting Insert According to the Invention

Figure 10:
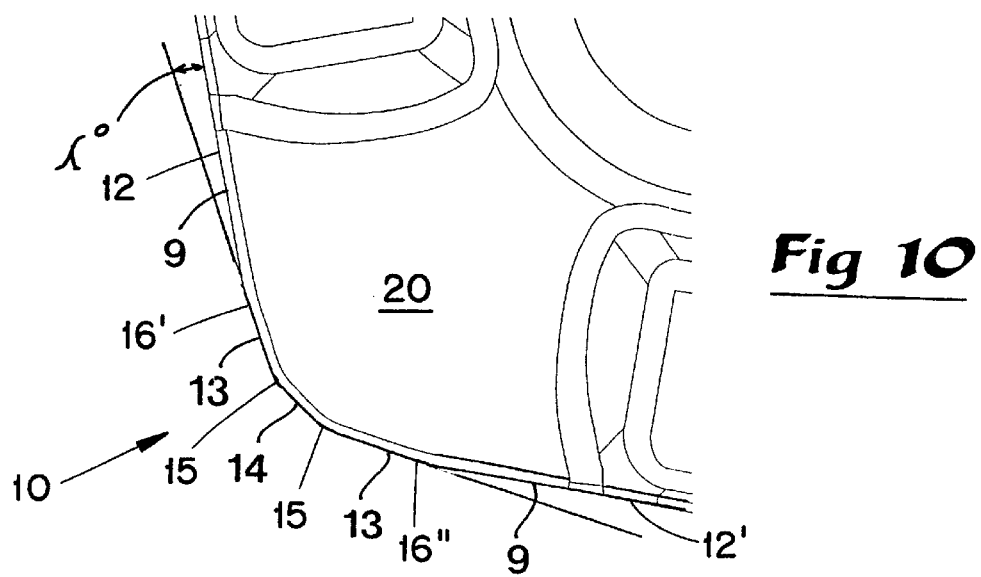
FIG. 10 is a partial, further enlarged planar view of only a corner portion of the cutting insert according to FIGS. 7–9.

When the individual cutting insert is to work a work piece, a suitable, active corner 10 on either of the opposite top and bottom sides of the cutting insert is selected, and then the cutting insert is disposed in a cassette 2 and fixed to a milling cutter in the way that is illustrated in FIGS. 1–4. When the cutting insert is fixed, the same is position determined in relation to the milling cutter and the rotation axis thereof automatically by virtue of the shape of the cassette and insert seat. More precisely, the cutting insert is located at a certain axial rake angle as well as at a certain radial rake angle. The last-mentioned angle has to be negative as a consequence of the cutting insert having a double negative basic shape. Otherwise, the flank surface adjacent to the major cutting edge would not go free from the work piece. Suppose that the side 7 is turned upwards and that the corner 10 of FIG. 10 is selected for executing the working. In doing so, the major cutting edge 12' together with the minor cutting edge 16" will effect the material-removing working, while the second minor cutting edge 16' at the same corner serves as a wiper edge which gives the worked surface smoothness. The cutting insert is, per se, fixed with a negative radial rake angle, but since the land 20 inside the edges 12', 16" has a concavely arched shape, said edges will, in practice, act with a positive cutting geometry inasmuch as the edges "hollow-out" the material rather than only shearing the same loose.

In addition to the fundamental advantage that the active corners become strong, the cutting insert according to the invention also has the advantage that high cutting performance is attained thanks to the positive cutting geometry during operative work at the same time as the cutting insert uses the advantages of the double negative cutting insert in respect of the possibility of making many cutting edges on one and the same cutting insert. Thus, as is seen in the previous description, the octagonal cutting insert according to the invention includes, according to FIGS. 7–10, in total sixteen major cutting edges (appurtenant minor cutting edges uncounted), more precisely eight major cutting edges on one of the sides and eight major cutting edges on the other side. Only eight of these sixteen major cutting edges may, per se, be used for one and the same type of milling operation, i.e. either right-hand cutting or left-hand cutting, but thanks to the cutting insert being neutral inasmuch as the same is entirely symmetrical, the advantage is won that one and the same cutting insert may, if required, be used for both types of working operations. In other words, two different types of right-hand and left-hand cutting inserts, respectively, need not be stock-kept. A particular advantage of the cutting insert according to the invention is that the same may be formed with a central aperture, the diameter of which is large in comparison with the dimension of the cutting insert without because of this the corners of the cutting insert becoming weak and without the support of the cutting insert against the bottom of the insert seat becoming unreliable. In other words, the cutting insert may, if required, be formed with minimal dimensions and in spite of this be fixed by means of simple fixing screws.

Figure 11:
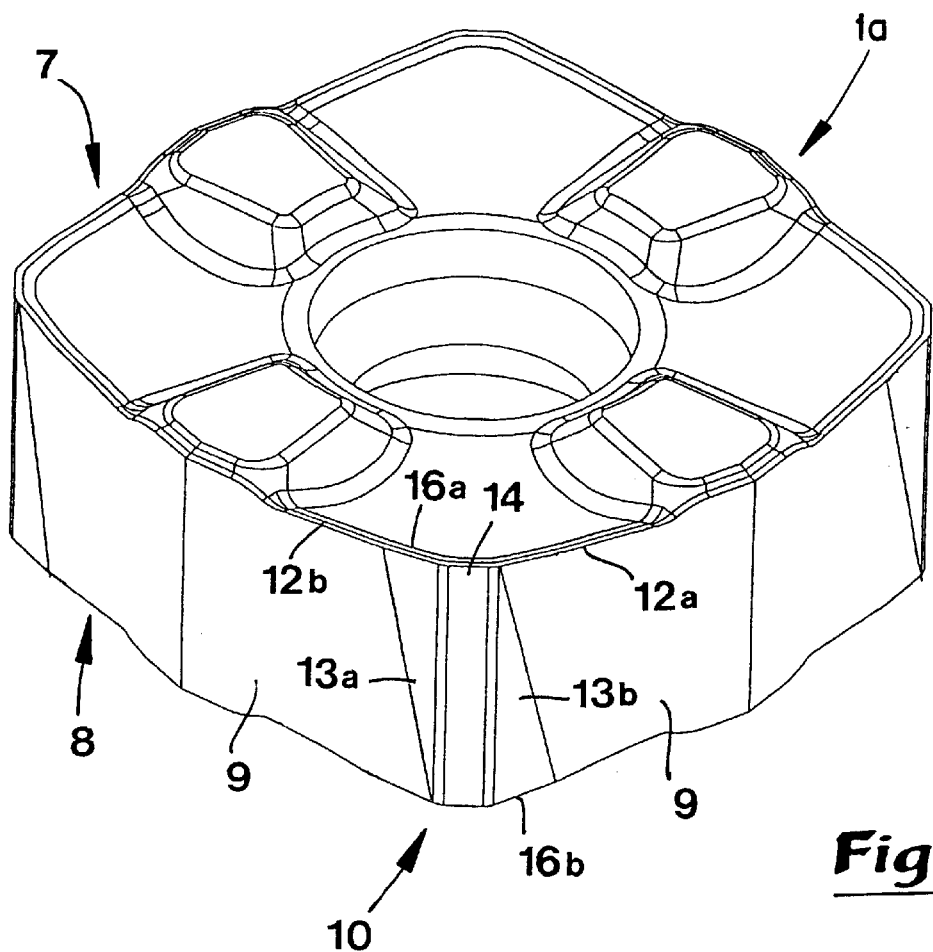
FIG. 11 is a perspective view similar to FIG. 7 showing an alternative embodiment of a cutting insert which is optimized for only right-hand cutting working.
Figure 12:
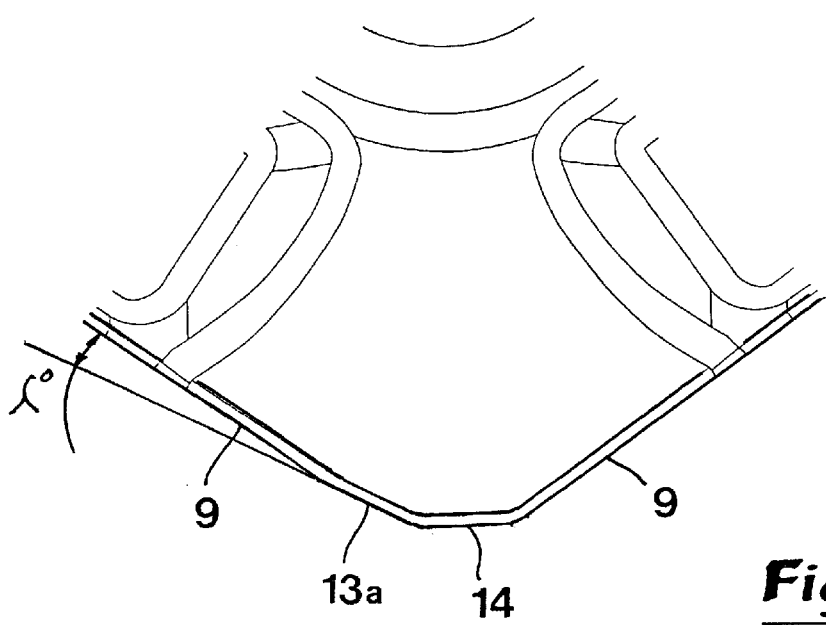
FIG. 12 is a partial, enlarged top view showing only a corner portion of the cutting insert according to FIG. 11.

Reference is now made to FIGS. 11 and 12, which illustrate a cutting insert 1a intended for only right-hand cutting milling operations. In this case, the two lands 13a, 13b adjacent to a transition surface 14 at an active corner are not of even thinness, but wedge-shaped tapering. Thus, the land 13a is pointed in the direction downwards and transforms at the upper edge thereof in a minor cutting edge 16a adjacent to the top side 7 of the cutting insert. The second parallel land 13b has the tip thereof turned upwards and transforms into a minor cutting edge 16b adjacent to the bottom side 8 of the cutting insert. In doing so, there is only one active major cutting edge 12a adjacent to a co-operating minor cutting edge 16. It should be observed that the major cutting edge 12a extends continuously from the nearby supporting projection 18 up to the transition surface 14. In other words, each minor cutting edge in extension of the major cutting edge 12a is missing.

Figure 13:
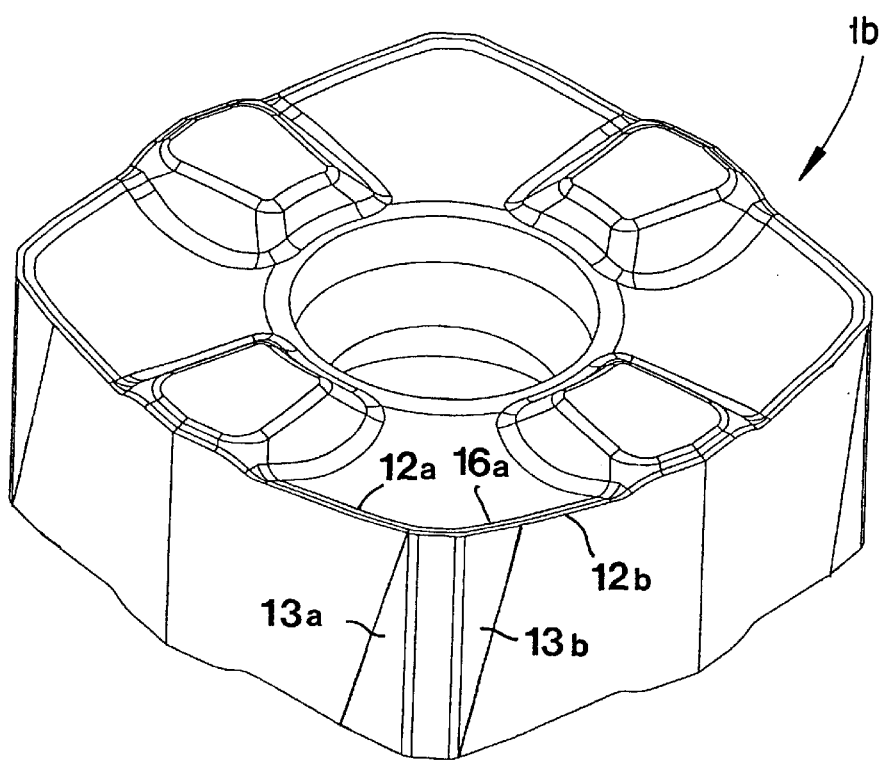
FIG. 13 is a perspective view showing another alternative embodiment of a cutting insert optimized for left-hand cutting working.
Figure 14:
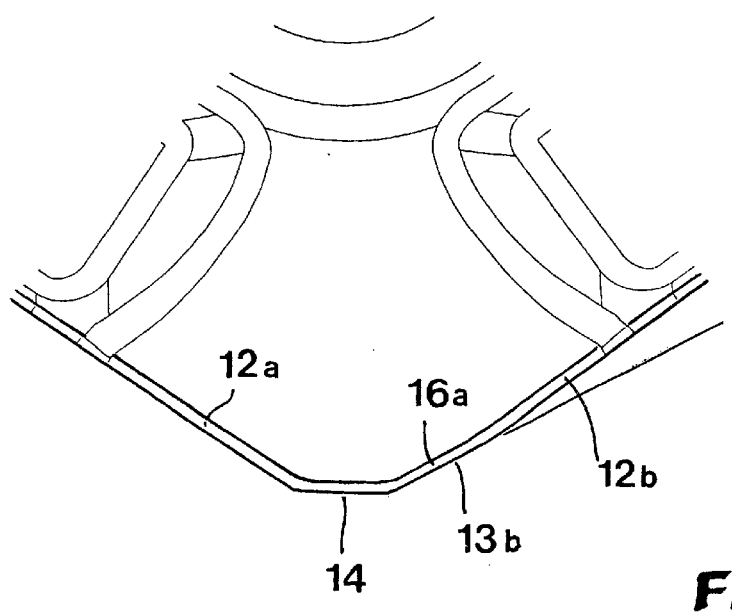
FIG. 14 is a partial, enlarged top view showing only a corner portion of the cutting insert according to FIG. 13.

In FIGS. 13 and 14 an analogous embodiment of cutting insert 1b is shown intended for left-hand cutting working. In this case, the wedge-shaped parallel lands 13a and 13b extend in the converse way, i.e. with the tip of the surface 13a pointing upwards and the tip of the surface 13b pointing downwards. In doing so, an actively cutting major cutting edge 12a is formed near the parallel land 13a, and a wiping minor cutting edge 16a is formed on the other side of the corner. The same minor cutting edge 16a transforms into an edge 12b, which do not form any major cutting edge.

Figure 15:
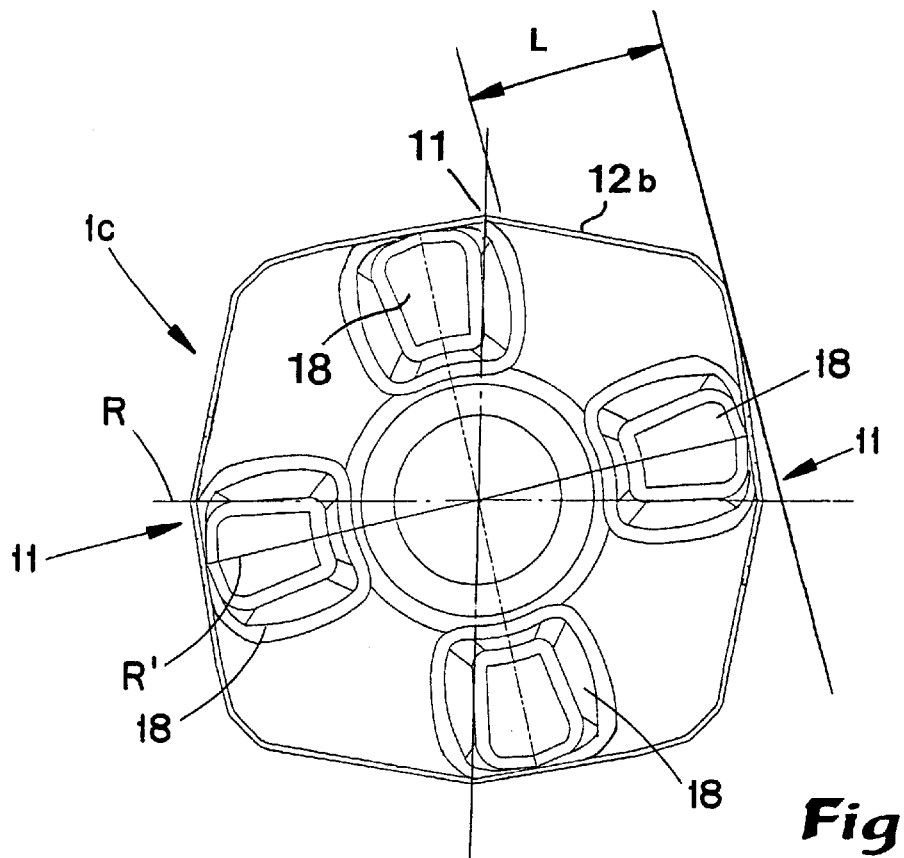
FIG. 15 is a top view of yet an additional alternative embodiment of the cutting insert according to the invention.
Figure 16:
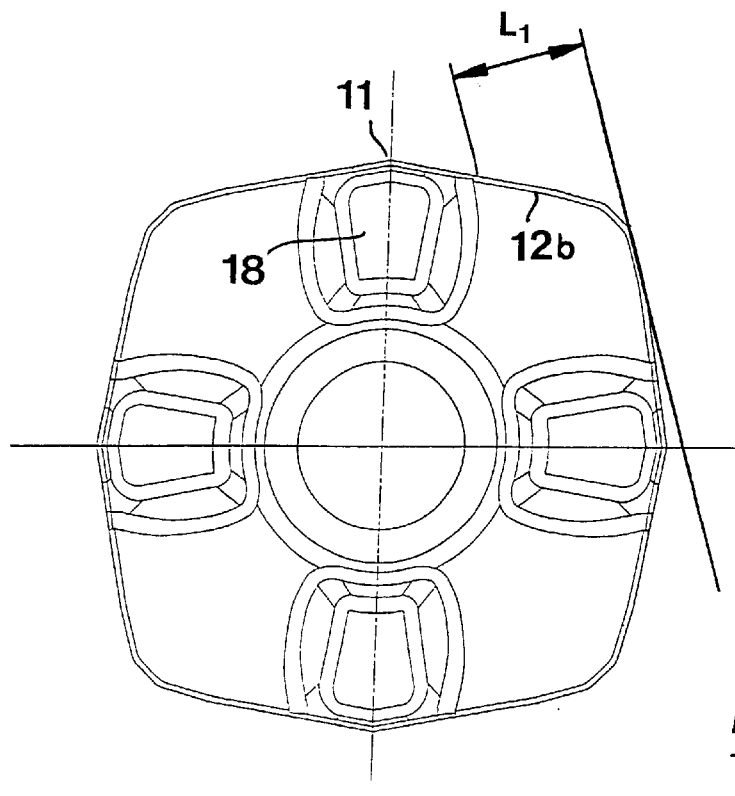
FIG. 16 is a top view shown for comparative purpose of a cutting insert according to FIG. 9.

In FIG. 15 an alternative embodiment of cutting insert 1c is shown according to which each individual supporting projection 18 is located laterally displaced in relation to its respective inactive corner 11. More precisely, a line R bisecting diagonally opposed ones of the inactive corners 11 forms an acute angle with a line R' bisecting diagonally opposed ones of the supporting projections 18. In the example, the cutting insert is optimized for right-hand cutting milling operations (compare FIGS. 11 and 12). By the fact that the supporting projection 18 is laterally displaced in relation to the corner 11, it is achieved that the operative major cutting edge 12b has a large length L. In practice, the cutting edge length L may be made about 50% larger than the same cutting edge length $L_1$ (see FIG. 16) of the above described cutting inserts which have the supporting projection thereof centrally placed in relation to each appurtenant inactive corner.

It should be pointed out that all edges in practice should be reinforced in a conventional way.

What is claimed is:

1. A double negative cutting insert for chip removing machining, including a body of generally flat polygonal basic shape; the body having opposite top and bottom sides of identical shape, and eight transverse flank surfaces extending between top and bottom sides, wherein the polygonal shape is octagonal with eight obtuse-angle corners comprising four active cutting corners, and four inactive cutting corners; two of the flank surfaces approaching one another at each active cutting corner and spaced from one another by a pair of lands; each flank surface forming a major cutting edge at the top side and a major cutting edge at the bottom side, and each land forming a minor cutting edge at least at one of the top and bottom sides, wherein each active cutting corner at the top and bottom sides includes at least one major cutting edge and at least one minor cutting edge; each of the top and bottom sides including four upstanding supporting projections disposed adjacent respective inactive corners; each supporting projection including a planar top surface; the top surfaces of the supporting projections on the top side lying in a common plane oriented parallel to a neutral plane of the body disposed midway between the top and bottom sides; the top surfaces of the supporting projections on the bottom side lying in a common plane oriented parallel to the neutral plane; each of the top and bottom sides including areas disposed at each active corner between respective pairs of adjacent supporting projections, the areas comprising concave lands to provide a positive cutting geometry during cutting operations.

2. The insert according to claim 1 wherein the flank surfaces at each active corner and inactive corner form an angle in the range of 110–160 degrees.

3. The insert according to claim 1 wherein the flank surfaces at each active corner and inactive corner form an angle in the range of 120–150 degrees.

4. The insert according to claim 1 wherein each active corner of the top and bottom sides includes two major cutting edges, one of such major cutting edges being operable for right-hand cutting and the other major cutting edge being operable for left-hand cutting; each active corner including a transition surface between the two lands; each land forming two of the minor cutting edges at the top side and bottom side, respectively.

5. The insert according to claim 1, wherein each land extends concavely continuously from one respective supporting projection to another respective supporting projection.

6. The insert according to claim 1 wherein each supporting projection has side surfaces converging toward the top surface of the respective supporting projection.

7. The insert according to claim 1 wherein the top surfaces of each supporting projection diminishes in surface area toward a center of the body.

8. The insert according to claim 1 wherein the body includes a central aperture for receiving a fastening screw, a ring-shaped bulge extending around the central aperture on each of the top and bottom sides and terminating in a planar abutment surface encircling the aperture.

9. The insert according to claim 8 wherein the abutment surface is coplanar with the top surfaces of the supporting projections on the respective one of the top and bottom sides.

10. The insert according to claim 1 wherein the planes containing the top surfaces of the supporting projections of the top and bottom sides, respectively, are spaced from the neutral plane by a greater distance than are the major and minor cutting edges.

11. The insert according to claim 1 wherein a line bisecting diametrically opposed supporting projections is oriented at an acute angle relative to a line bisecting radially opposed inactive corners in which the respective supporting projections are disposed.

* * * * *